(12) United States Patent
Caulder

(10) Patent No.: US 9,834,127 B2
(45) Date of Patent: Dec. 5, 2017

(54) MULTI-PURPOSE TELESCOPING TRAILER

(71) Applicant: Larry Caulder, Travelers Rest, SC (US)

(72) Inventor: Larry Caulder, Travelers Rest, SC (US)

( * ) Notice: Subject to any disclaimer, the term of this patent is extended or adjusted under 35 U.S.C. 154(b) by 0 days.

(21) Appl. No.: 15/173,782

(22) Filed: Jun. 6, 2016

(65) Prior Publication Data

US 2016/0355222 A1 Dec. 8, 2016

Related U.S. Application Data

(60) Provisional application No. 62/170,791, filed on Jun. 4, 2015.

(51) Int. Cl.
*B60P 3/34* (2006.01)
*B60P 3/07* (2006.01)

(52) U.S. Cl.
CPC .. *B60P 3/07* (2013.01); *B60P 3/34* (2013.01)

(58) Field of Classification Search
CPC ........ B01D 21/06; B01D 21/22; B01D 27/08; B01D 35/14; B65H 2511/11; B60P 3/08; B60T 8/1708; B60T 13/66; B60T 7/20; B60R 1/025
USPC .............. 296/26.01; 280/432, 433, 477, 656
See application file for complete search history.

(56) References Cited

U.S. PATENT DOCUMENTS

| | | | | | |
|---|---|---|---|---|---|
| 3,966,075 | A | * | 6/1976 | Schultz | B65D 88/005 105/393 |
| 4,106,732 | A | * | 8/1978 | Whiting | B60P 3/34 296/171 |
| 4,133,571 | A | * | 1/1979 | Fillios | B60P 3/34 296/165 |
| 4,886,411 | A | * | 12/1989 | Pieperhoff | B65F 3/00 135/141 |
| 4,995,664 | A | * | 2/1991 | Buday | B60P 3/32 292/33 |
| 5,203,603 | A | * | 4/1993 | Hertzberg | B60J 7/041 296/100.03 |
| 5,368,396 | A | * | 11/1994 | Cantrell | B60J 7/041 16/98 |
| 5,628,541 | A | * | 5/1997 | Gardner | B60P 3/34 296/165 |
| 5,658,032 | A | * | 8/1997 | Gardner | B60P 3/34 296/175 |
| 6,059,349 | A | * | 5/2000 | Doll | B61D 39/003 296/100.03 |
| 6,257,638 | B1 | * | 7/2001 | Graber | B60P 3/34 296/26.01 |

(Continued)

*Primary Examiner* — Kiran B Patel
(74) *Attorney, Agent, or Firm* — John B. Hardaway, III; Nexsen Pruet, LLC

(57) ABSTRACT

A multi-purpose telescoping trailer for transporting a vehicle and providing expandable enclosed interior space is disclosed. The interior space may be expanded into the vehicle space when the vehicle is not present. The trailer includes a frame having at least two wheels, a bed for receiving and transporting a vehicle and a means for securing the trailer to a towing vehicle. The trailer also includes an inner housing and an outer housing that together form an expandable enclosed interior space. The interior space can be expanded by sliding the inner housing generally outside of the outer housing in a telescoping manner when there is no vehicle stored in the vehicle bed.

5 Claims, 6 Drawing Sheets

(56) References Cited

U.S. PATENT DOCUMENTS

| | | | | |
|---|---|---|---|---|
| 7,017,975 | B2* | 3/2006 | Parmer | B60P 3/341 |
| | | | | 296/157 |
| 7,118,158 | B2* | 10/2006 | Schlipp | B60J 7/026 |
| | | | | 296/100.03 |
| 7,568,877 | B1* | 8/2009 | Nespor | B60P 1/02 |
| | | | | 414/544 |
| 9,205,881 | B2* | 12/2015 | Vandergon | B60G 99/00 |
| 2008/0265600 | A1* | 10/2008 | Barker | B60P 1/43 |
| | | | | 296/3 |
| 2010/0086386 | A1* | 4/2010 | Freeman | B60P 1/433 |
| | | | | 414/477 |
| 2015/0102632 | A1* | 4/2015 | Pham | B60P 3/34 |
| | | | | 296/175 |
| 2015/0258927 | A1* | 9/2015 | Williams | B60P 3/07 |
| | | | | 296/3 |
| 2015/0314734 | A1* | 11/2015 | Robinson | B60R 9/06 |
| | | | | 414/462 |
| 2015/0367766 | A1* | 12/2015 | Jaeger | B60P 1/04 |
| | | | | 414/812 |
| 2016/0168843 | A1* | 6/2016 | Bell | B60P 3/122 |
| | | | | 280/79.2 |
| 2016/0288690 | A1* | 10/2016 | Wills | B60P 3/34 |
| 2016/0339826 | A1* | 11/2016 | Buri | B60P 3/14 |
| 2017/0072829 | A1* | 3/2017 | Cripe | B60P 3/34 |

\* cited by examiner

MULTI-PURPOSE TELESCOPING TRAILER

CROSS-REFERENCE TO RELATED APPLICATIONS

N/A

FIELD OF THE INVENTION

This invention relates generally to the art of multi-purpose convertible trailers and more particularly to trailers that include expandable enclosed space.

BACKGROUND

The present invention discloses an expandable trailer and more particularly a trailer that includes an enclosed space that can be expanded and contracted by sliding multiple telescoping housings and can transport a vehicle when the enclosed space is in a contracted position.

Various types of expandable trailers exist for camping and other activities in which the interior living space of the trailer can be expanded when the trailer is not being transported between locations. However, other expandable trailers do not allow for the transportation of a vehicle in addition to the expandable interior space.

In many situations, it may be advantageous to transport a vehicle in addition to the vehicle towing the trailer. For example, race car drivers and racing teams need to transport their race cars from one race track to another without driving it on public roads. Race teams typically spend multiple days at a race track or other events such that it is beneficial to have an enclosed interior space on a trailer for living at or near the event while waiting to use the race car. Race teams often travel with two trailers: one for the race car and one for living quarters. However, this requires at least two drivers to transport the trailers to each event. Accordingly, there exists the need for one trailer that can be used to both transport a vehicle and provide living quarters.

The length and width of vehicle trailers used on public roadways are regulated by federal and state law. Special permits are often required to transport oversized vehicles and trailers over public highways. Therefore, it is advantageous to have a compact trailer that can be expanded when not in transit.

The present invention overcomes these problems and others by, among other things, providing a trailer with a bed for transporting a vehicle and an expandable interior space for use when the trailer is not transporting a vehicle.

SUMMARY

The following presents a simplified summary of the invention in order to provide a basic understanding of some aspects of the invention. This summary is not an extensive overview of the invention. It is not intended to identify key or critical elements of the invention or to delineate the scope of the invention; its sole purpose is to present concepts of the invention in a simplified form as a prelude to the more detailed description that is subsequently presented.

It is an object of the present invention to, among other things, provide a trailer that can be transported via a towing vehicle and can carry a vehicle, such as a race car, in an open vehicle bed while also providing an enclosed interior living or storage space that can be expanded via telescoping housings when a vehicle is not stored in the open bed.

The present invention includes a trailer frame with at least two wheels and at least one axle, a bed for carrying a vehicle and a means for attaching the trailer to the trailer hitch of a towing vehicle. In one embodiment, the bed for carrying the vehicle is not fully enclosed, such that it is generally open to the top, rear and both sides. The trailer also includes an enclosed interior space that is defined by an inner housing and an outer housing. Additional intermediate housings are possible in various embodiments. When the enclosed interior space is in a contracted position, the inner housing in substantially inside of the outer housing. The inner housing can slide at least partially out of the outer housing to expand the enclosed interior space when the trailer is not transporting a vehicle on the bed.

Those skilled in the art of trailers will readily appreciate these and the other features and their advantages of the present invention from a careful review of the Detailed Description of Representative Embodiments.

To accomplish the above and related objects of the invention, certain embodiments of the present invention have been depicted in the accompanying drawings. The drawings are illustrative only. There is no intent to limit the invention to the embodiment or embodiments disclosed therein. On the contrary, the intent is to include all alternatives, modifications and equivalents of the invention as disclosed. Variations are contemplated as being part of the invention as defined by this application.

DETAILED DESCRIPTION OF REPRESENTATIVE EMBODIMENTS

The present invention is related to a multi-purpose trailer that can transport a vehicle and provide expandable enclosed interior space via telescoping housings that can be expanded when a vehicle is not in the trailer bed. The invention will be described with reference to the figures, which are an integral non-limiting component of the invention. Throughout the description similar elements will be numbered accordingly.

Figure 1:
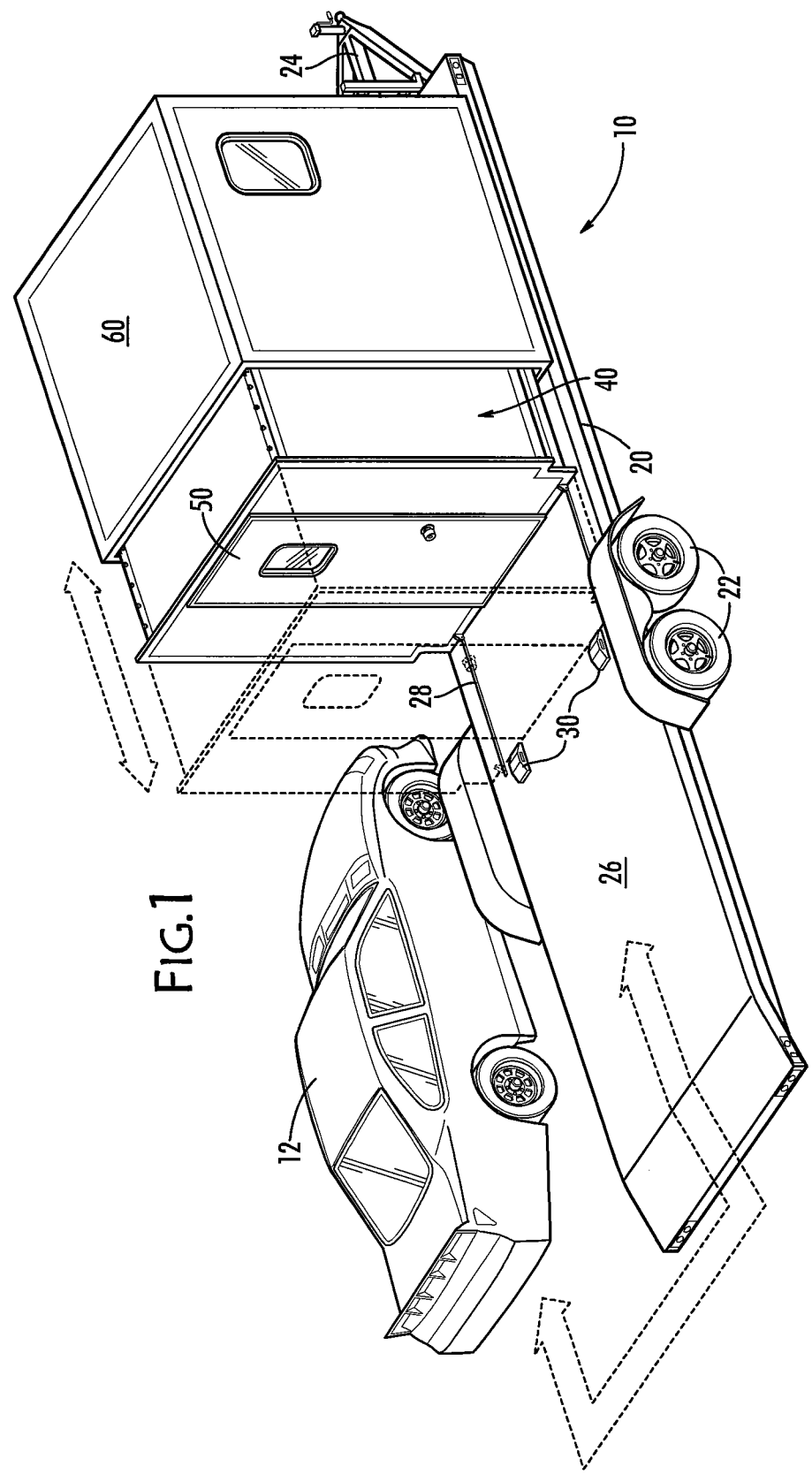
FIG. 1 is a perspective view of the present invention with the inner housing between an expanded position and a contracted position and a vehicle next to the trailer.

FIG. 1 illustrates an embodiment of the telescoping trailer 10 of the present invention. In FIG. 1, a vehicle 12 is shown next to the trailer 10 with phantom arrows showing how the vehicle 12 can be loaded onto the bed 26 of the trailer. The bed 26 comprises a generally flat surface dimensioned to allow a vehicle, such as a race car, to be secured in the bed 26 for transportation from one location to another. The bed 26 in the embodiment shown in FIG. 1 is generally open to the top, sides and rear, but the bed 26 can be partially or fully enclosed in other embodiments. The telescoping trailer 10 also includes a frame 20 that can be made of steel, composite material or other rigid materials and a tongue 24 attached to the front of the frame 20 that includes a coupling mechanism for attaching the trailer 10 to a towing vehicle. The frame 20 shown in FIG. 1 also contains two axles with wheels 22 rotatably affixed to them to allow for lateral movement of the trailer 10, although more or less axles are possible in other embodiments. The frame 20 has an outer housing 60 attached to the top of it, which generally comprises a floor, a roof, two sides and a front wall, but is generally open to the rear. FIG. 1 shows an inner housing 40 in a transitional position between a contracted position and an expanded position. The inner housing 40 generally comprises a floor, a roof, two sides and a rear wall, but is generally open to the front. The inner housing 40 and the outer housing 60 are configured to form an expandable enclosed interior space that can be used for storage, living quarters or other purposes.

When the inner housing 40 is in a contracted position, the roof, floor and two sides of the inner housing 40 fit generally inside of the outer housing 60 in a telescoping manner such that the rear wall of the inner housing 40, the front wall of the outer housing 60 and the floors, roofs and side walls of each housing form a small enclosed space.

When the inner housing 40 is in an expanded position, the roof, floor and two sides of the inner housing 40 are generally outside of the outer housing 60 with only a slight overlap to create an expanded enclosed interior space. The rear wall of the inner housing 40 also contains a door 50 to allow entry into the enclosed interior space. Windows and other accoutrements are possible depending on the embodiment. The inner housing 40 can be moved from an expanded position to a contracted position by sliding the inner housing 40 on wheels 46 that are mounted on the bottom of the inner housing 40 which are coupled with tracks 28 that are mounted to top of the frame 20 and additional rollers 48 that are mounted to the top of the roof of the inner housing 40 which are coupled with tracks that are mounted to the bottom of the roof of the outer housing 60. FIG. 1 also shows a stopping mechanism 30 mounted to the top of the vehicle bed 26 that can lock the inner housing 40 in an expanded position and also secure a vehicle 12 in the vehicle bed 26 for transportation when the inner housing 40 is in a contracted position. Although the embodiment shown in FIG. 1 only shows an outer housing 60 and an inner housing 40, additional intermediate housings can be used in the present invention to enable further expansion of the enclosed interior space via telescoping.

Figure 2:
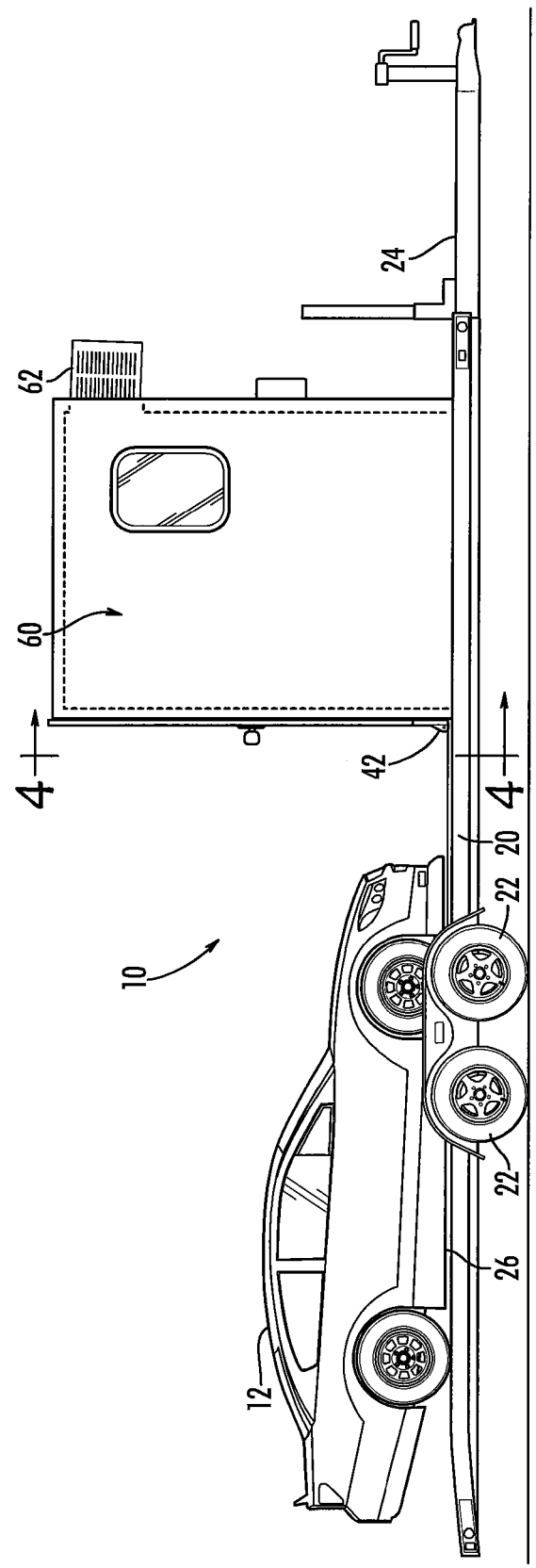
FIG. 2 is a side view showing the inner housing in a contracted position and a vehicle in the bed of the trailer.

FIG. 2 illustrates an embodiment of the present invention from a side view where a vehicle 12 has been loaded into the vehicle bed 26 of the trailer 10. The inner housing 40 is in a contracted position such that it is generally inside of the outer housing 60 except for the rear wall of the inner housing 40. When the inner housing 40 is in a contracted position, such as in FIG. 2, the floor, roof and side walls of the inner housing 40 fit generally snuggly inside of the floor, roof and side walls of the outer housing 60 to create a nested telescoping effect. FIG. 2 also shows a ventilation system 62 mounted on the front of the outer housing 60 to allow for heating, air conditioning and ventilation of the enclosed interior space. The frame 20 of the trailer 10 includes a tongue 24 that includes additional equipment to allow the trailer 10 to be easily coupled to the trailer hitch of a towing vehicle. FIG. 2 also generally shows the location of the cross-sectional view depicted in FIG. 4.

Figure 3:
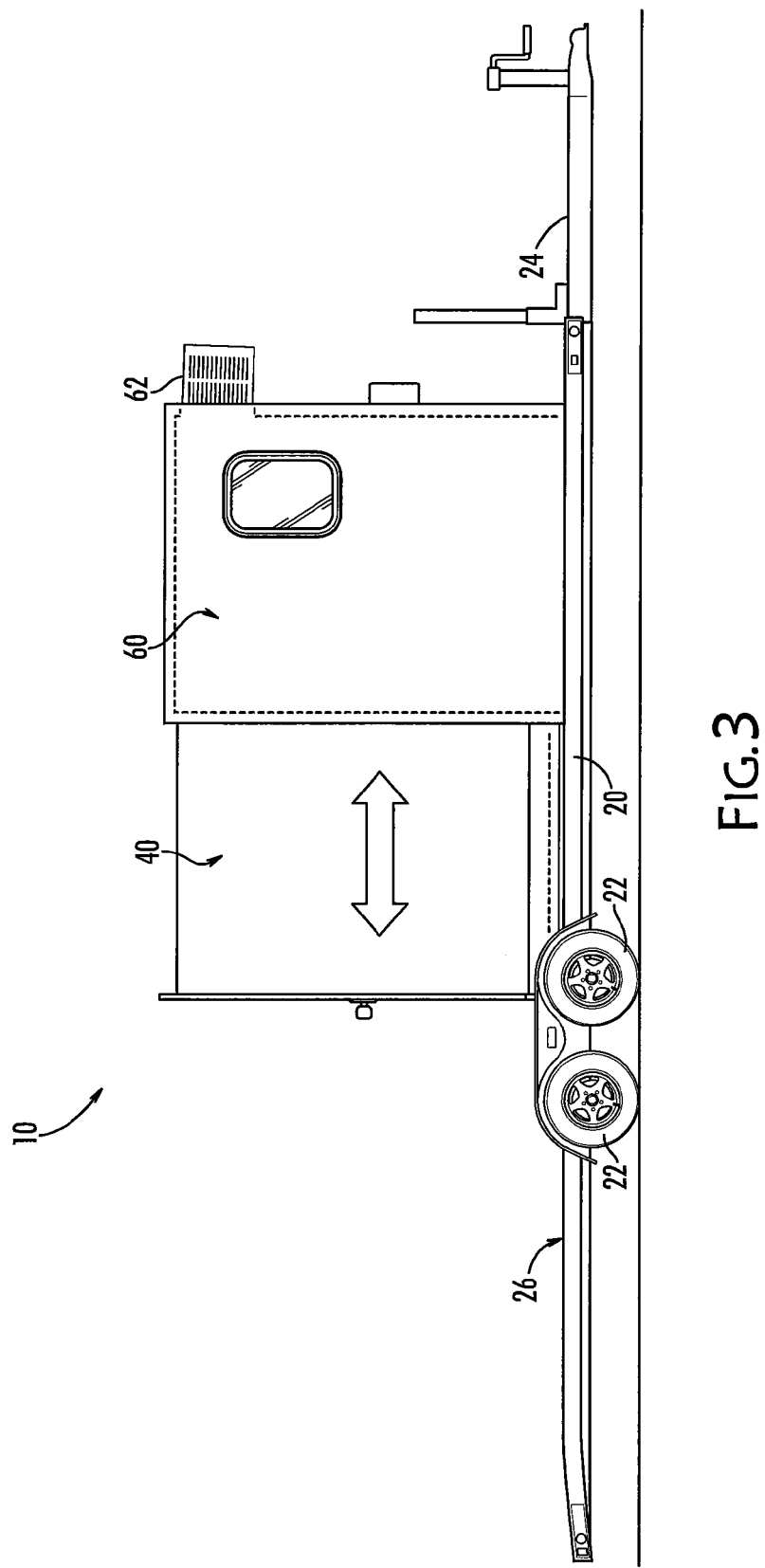
FIG. 3 is a side view showing the inner housing in an expanded position and no vehicle in the bed of the trailer.

FIG. 3 illustrates a side view of the trailer 10 of an embodiment of the present invention with the inner housing 40 in a generally expanded position and no vehicle on the vehicle bed 26.

When the inner housing 40 is in an expanded position, such as in FIG. 3, the floor, roof and side walls of the inner housing 40 only slightly overlap with the floor, roof and side walls of the outer housing 60 to create a generally air-tight seal between the inner housing 40 and outer housing 60. The inner housing 40 can be moved from an expanded position to a contracted position by sliding the inner housing 40 in a forward direction and generally into the outer housing 60. While the trailer 10 is generally intended to be used in an expanded position when it is in a parked position, it can be transported in an expanded position if there is no vehicle in the bed 26. However, additional embodiments allow for a vehicle to fit in the bed 26 when the inner housing 40 is in an expanded position as well.

Figure 4:
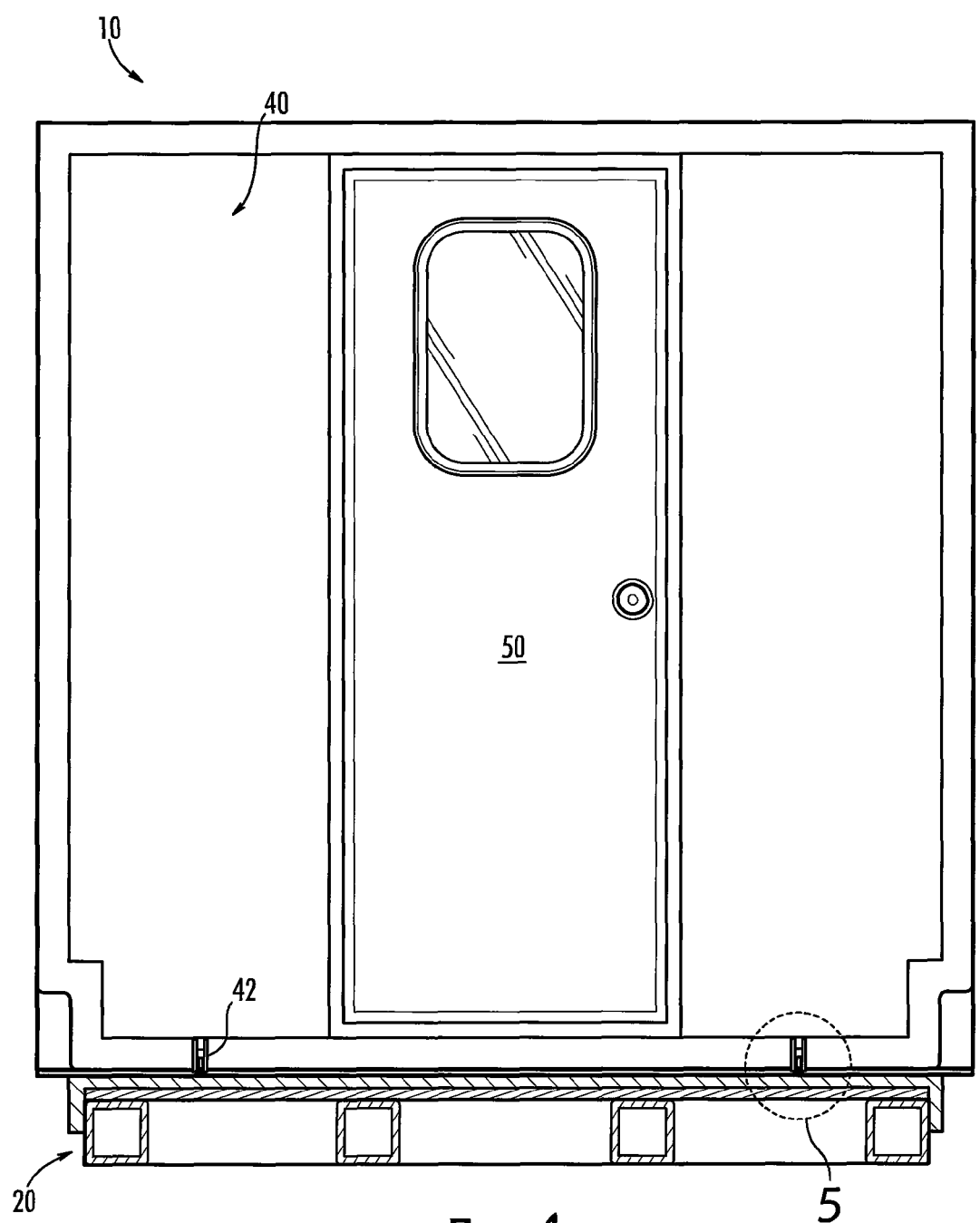
FIG. 4 is a rear view showing the back wall of the inner housing and a cross section of the frame of the trailer.

FIG. 4 illustrates a cross-sectional view of the trailer 10 when facing a forward direction from the location generally identified in FIG. 2. The cross-section of the frame 20 shows one of multiple possible configurations for beams and other elements of the frame 20 that support the trailer 10. FIG. 4 also shows the rear wall of the inner housing 40 which contains a door 50 leading into the expandable enclosed interior space. Wheel assemblies 42 are mounted on the bottom of the inner housing 40 that roll on tracks 28 to facilitate the expansion and contraction of the enclosed interior space by sliding the inner housing 40 generally into and out of the outer housing 60. FIG. 4 also shows the location of the enlarged view depicted in FIG. 5.

Figure 5:
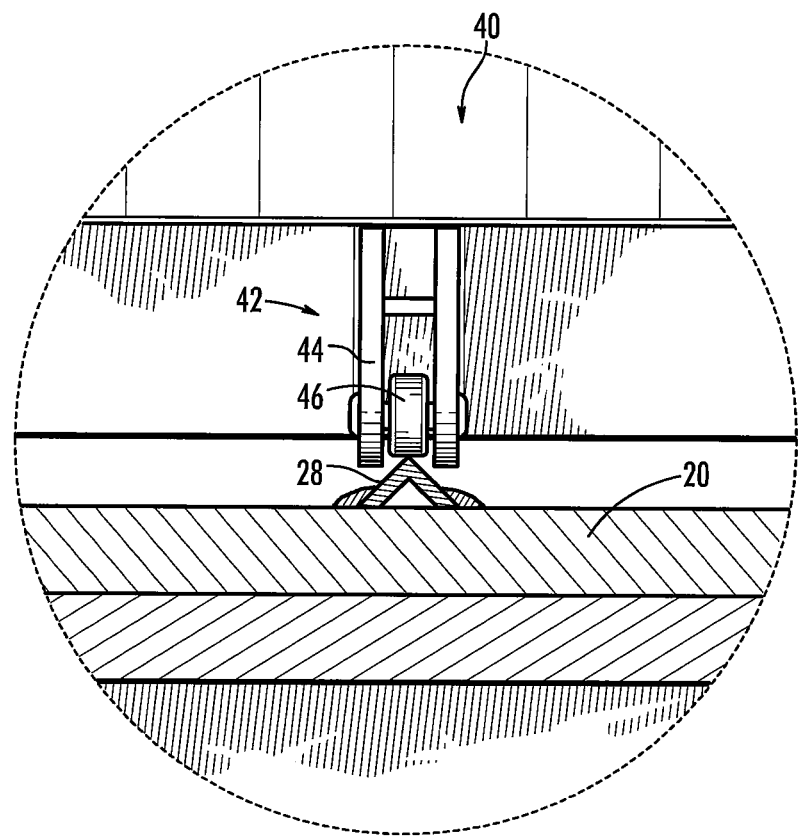
FIG. 5 is an enlarged rear view showing a wheel assembly, a portion of the rear wall of the inner housing and a cross section of the frame of the trailer.

FIG. 5 illustrates an enlarged view of a wheel assembly 42 from a forward-facing direction as shown in FIG. 4. The wheel assembly 42 is mounted generally on the bottom of the inner housing 40 and is coupled with a track 28 that is mounted on the top of the bed 26 of the frame 20. The track 28 in this embodiment runs in generally the same direction as the trailer 10 moves when being pulled by a tow vehicle, which allows the inner housing 40 to slide in a forward and rearward direction. The track 28 shown in FIG. 5 has an inverted V-shape such that the center of the track 28 is raised above the sides of the track 28, and it intersects with the wheel 46 of the wheel assembly 42. Similar to the track 28, the wheel 46 can include an inverted V-shaped indention along the circumference of the wheel 46 to mate with the track 28 to prevent derailment. The wheel assembly 42 generally comprises two wheel supporting members 44 attached to the inner housing 40 in a vertical position and an axle that runs between the wheel supporting members 44 to allow the wheels to rotate along a horizontal axis.

Figure 6:
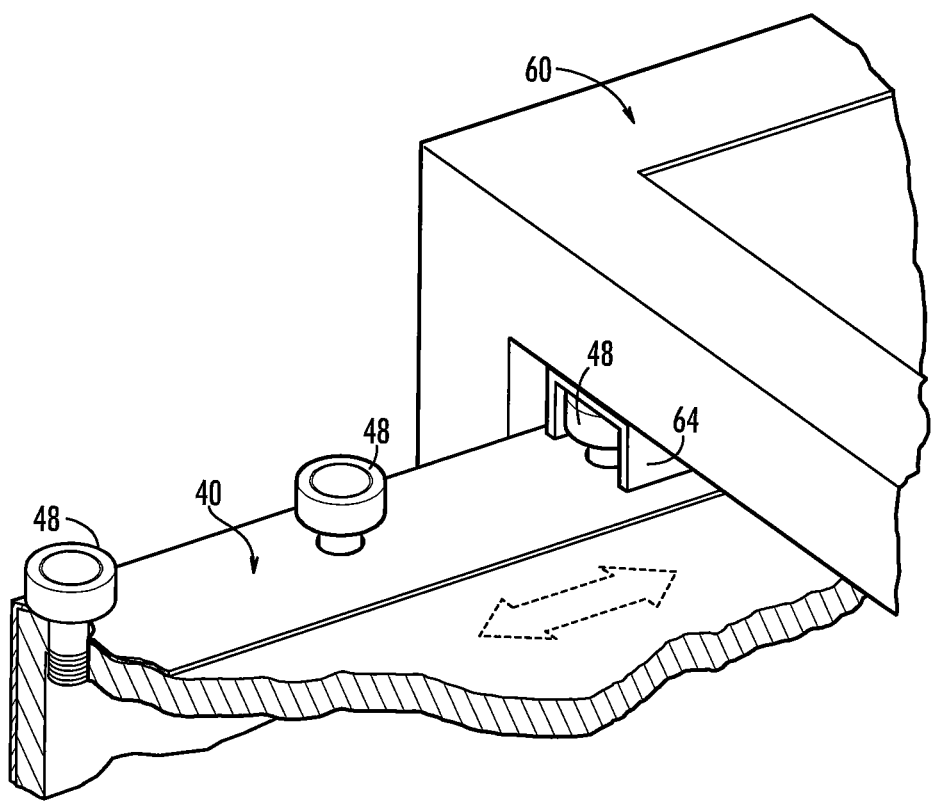
FIG. 6 shows a perspective view of a portion of the outer housing and a portion of the inner housing, including some of the rollers mounted on the roof of the inner housing.

FIG. 6 illustrates a portion of the roof of the outer housing 60 and a portion of the roof of the inner housing 40 of an embodiment of the present invention when the inner housing 40 is in a transitional position between a contracted position and an expanded position. A track 64 is mounted to the bottom side of the roof of the outer housing 60 and runs along the roof of the outer housing 60 in a forward direction to facilitate the sliding of the inner housing 40 in a forward and rearward direction. The embodiment shown in FIG. 6 includes cam rollers 48 mounted to the roof of the inner housing 40. However, different types of rollers, bearings or other mechanisms can be used to facilitate the inner housing 40 sliding generally into and out of the outer housing 60. The cam rollers 48 shown in the embodiment depicted in FIG. 6 engage with the track 64 to assist the floor, roof and side walls of the inner housing 40 moving in a direction that is parallel to the floor, roof and side walls of the outer housing 60 when the enclosed interior space of the trailer 10 is expanded and contracted.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. For example, several configurations with modified shapes, sizes, and dimensions of the features of the telescoping trailer are suitable for the design of the present invention. Likewise, other configurations altering the number of parts, attachment positions of the parts, means for attaching and securing the parts could be employed to demonstrate the invention and are intended to be encompassed by the present invention. Thus, the present invention should not be limited by the description or any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

What is claimed is:

1. A telescoping trailer comprising:
   a frame having at least two wheels, a bed for receiving a vehicle and a means for securing the frame to a towing vehicle;
   an outer housing affixed to the top of the frame having a front wall, two side walls, a floor and a roof;
   a moveable inner housing having a back wall, two side walls, a floor and a roof wherein the outer housing and the inner housing create an expandable enclosed space and the roof, floor and two side walls of the inner housing are substantially inside of the roof, floor and two side walls of the outer housing to form a contracted position; and
   said inner housing being capable of sliding partially out of said outer housing onto said bed for said vehicle when said vehicle is not present.

2. The telescoping trailer of claim 1 wherein the bed is open to the top, sides and back when the inner housing is in the contracted position.

3. The telescoping trailer of claim 2 including at least one track mounted on the frame coupled a wheel mounted on the floor of the inner housing to facilitate movement of said inner housing.

4. The telescoping trailer of claim 3 further including a plurality of rollers mounted on the roof of the inner housing coupled with at least one track mounted on the roof of the outer housing to facilitate movement thereof.

5. The telescoping trailer of claim 4 further comprising a means for securing the inner housing in place when in the contracted position and in the expanded position.

* * * * *